United States Patent
Knoppert et al.

(10) Patent No.: US 11,693,249 B2
(45) Date of Patent: *Jul. 4, 2023

(54) CLAMPING FORCE ADJUSTING HEADSET

(71) Applicant: Dell Products L.P., Round Rock, TX (US)

(72) Inventors: Michiel Sebastiaan Emanuel Petrus Knoppert, Amsterdam (NL); Gerald Rene Pelissier, Mendham, NJ (US); Thomas Marcus Hinskens, Utrecht (NL)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/171,985

(22) Filed: Feb. 9, 2021

(65) Prior Publication Data
US 2022/0252889 A1   Aug. 11, 2022

(51) Int. Cl.
| G02B 27/01 | (2006.01) |
| G06F 1/16 | (2006.01) |
| H04R 1/00 | (2006.01) |
| H04R 5/00 | (2006.01) |

(52) U.S. Cl.
CPC ....... *G02B 27/0176* (2013.01); *G06F 1/1601* (2013.01); *H04R 1/00* (2013.01); *H04R 5/00* (2013.01)

(58) Field of Classification Search
CPC ..... G02B 27/0176; G06F 1/1601; H04R 1/00; H04R 5/00
See application file for complete search history.

(56) References Cited

U.S. PATENT DOCUMENTS

| 2008/0175406 A1 | 7/2008 | Smith | |
| 2010/0189303 A1 | 7/2010 | Danielson et al. | |
| 2018/0046147 A1* | 2/2018 | Aghara | G06F 3/012 |
| 2018/0314323 A1* | 11/2018 | Mikhailov | G06T 7/251 |
| 2019/0072772 A1* | 3/2019 | Poore | G06F 3/013 |
| 2021/0080996 A1* | 3/2021 | Hudman | G06F 1/1679 |

* cited by examiner

*Primary Examiner* — Curtiis A Kuntz
(74) *Attorney, Agent, or Firm* — Terrile, Cannatti & Chambers, LLP; Emmanuel A. Rivera

(57) ABSTRACT

A system, method, and computer-readable medium are disclosed for performing clamping force adjustment on a virtual reality (VR) headset. User preferences as to clamping force at one or more positions, such as rest position on top of the user's head and VR mode position on user's face, are determined. The preferences are stored in a user profile. When a user places the VR headset, clamping force at a position is measures and clamping force is adjusted at that position.

14 Claims, 9 Drawing Sheets

CLAMPING FORCE ADJUSTING HEADSET

BACKGROUND OF THE INVENTION

Field of the Invention

The present invention relates to headset devices. More specifically, embodiments of the invention relate to a clamping force adjustment for an open loop virtual reality (VR) headset.

Description of the Related Art

Virtual reality or VR headsets typically have a closed loop design. A support band is used to keep the headset on a user's head and can be at the back of the user's head. Another band provides the hardware for the VR headset and is placed on the face of the user, with part of the band resting on the user's nose. The two bands complete the closed loop design.

The function and comfort of a VR headset, especially after long periods of use, greatly depend on how well the VR headset stays in position on a user's head. The closed loop design can provide for a secure fit; however, the closed loop design or form factor can be difficult in putting on and off the VR headset.

VR headsets, that are used in environments such as offices, laboratories, and households, can have different users. Different users have varying size heads and comfort levels, which are unique to each individual user. Therefore, to maximize the use and performance of a headset, the ability to make adjustments should be provided for individual users. Typically, such VR headsets, have limited adjustability to accommodate different users.

VR headsets that may have adjustable features may require each user to adjust and set/reset a headset, and specifically commonly used headsets. Typically, headset adjustments are performed manually. A user may manually adjust the band around the headset for the size of their head.

When an adjustable VR headset is commonly used by multiple users, whenever the VR headset is used by a different user, headset settings or adjustments are changed for the particular individual user. Depending on the settings that are available for the VR headset and the ease of adjusting the settings, changing the adjustments of the VR headset for a different user can take considerable time and effort.

SUMMARY OF THE INVENTION

A system, method, and computer-readable medium are disclosed for performing clamping force adjustment on a virtual reality (VR) headset. User preferences as to clamping force at one or more positions, such as rest position on top of the user's head and VR mode position on user's face, are determined. The preferences are stored in a user profile. When a user places the VR headset, clamping force at a position is measures and clamping force is adjusted at that position.

BRIEF DESCRIPTION OF THE DRAWINGS

The use of the same reference number throughout the several figures designates a like or similar element. The present invention may be better understood, and its numerous objects, features, and advantages made apparent to those skilled in the art by referencing the accompanying drawings, wherein.

DETAILED DESCRIPTION

Figure 1:
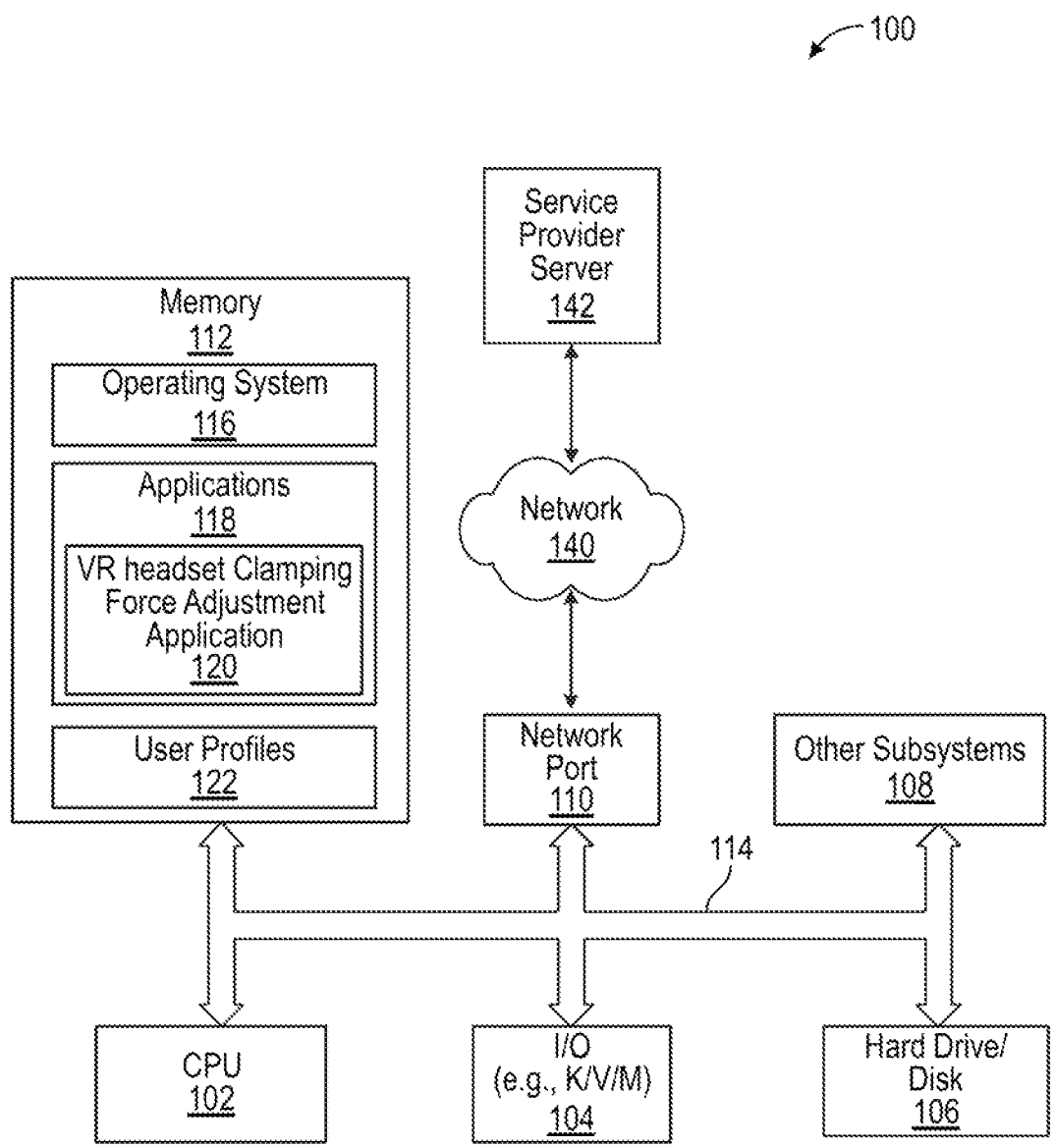
FIG. 1 depicts a general illustration of a computing system as implemented in the system and method of the present invention.

Described herein is an open loop design or form factor virtual reality (VR) headset. Such an open loop design is similar to over-the-head headphones that provide a single band and are used for audio. For the VR headset described herein, ear cups are at either ends of a single flexible "C" shape or open loop band. The band can be worn over-the-head when VR headset is not in VR mode. When the VR headset is in VR mode, the band is worn across the user's face.

The band of the VR headset is adjusted from rest position when the band over-the-head and when the band is across the user's face. Considering that typical head shapes of users are oval, clamping force is different for rest position and VR mode position. Ear cups are at different distances for each position. In other words, when in rest position, curvature of the band is such that the ear cups are too close together as compared to the VR mode position.

When an open loop VR headset is put on (i.e., rest position), the band opens up, and clamping force between the earcups increases. When the VR headset is adjusted for different ear-hole positions, compression force is adjusted. Head size (e.g., width) variation is also a factor that affects the compression force.

Described herein, is a VR headset that provides or adjusts for acceptable clamping force exerted on a user's head to provide comfort and use performance. In particular, clamping force is adjusted to provide user comfort (e.g., too much weight on user's nose) when in VR mode and to prevent the VR headset from slipping off the user. In addition, distance between a user's eyes and VR lenses (i.e., optical engines) are adjusted to address consistent/correct focus.

Various implementations provide for a clamping force adjustment mechanism that is independent from size adjust of the VR headset. The clamping force can be adjusted with a rachet wire retention system mechanism, wire lock, motor and "muscle wire". Therefore, such a clamping force adjustment mechanism provides for the open loop VR headset to fit securely on a user. The open loop design or form factor allows the VR headset to be easily placed on a user's head and to go between rest position and VR mode position.

Implementations can provide that when the VR headset is picked up by a user, the VR headset is initiated. An accelerometer on the VR headset can detect when the VR headset is picked up. In various implementations, the VR headset is activated when a user is recognized. The activation can be performed based on recorded user information found in stored user profiles. Implementations provide that when a user initially uses the VR headset, an iris scan takes place. Cameras on the optical engines scan the user's left iris and right iris. The scanned iris data is unique to each user. Ergonomic adjustments can be made using controls on the VR headset. The ergonomic adjustments or preferences can include clamping force.

A user profile is created with the unique user iris data and the user ergonomic adjustments. The user profile is stored for future reference. Therefore, during subsequent uses, when a user places the VR headset on, an iris scan of the user occurs, and the user is recognized by the user's iris scan data. A positive iris scan pulls up the user profile and the user's preferences are performed on the VR headset.

FIG. 1 illustrates an information handling system 100 that can be used to implement the system and method of the present invention. The information handling system 100 can be embodied as various computing and processing devices, such as a virtual reality (VR) headset, as described herein. The information handling system 100 can also be embodied as a source to, or a controlling device of, a VR headset. The information handling system 100 includes one or more processors (e.g., central processor unit or "CPU", embedded controller, etc.) 102, input/output (I/O) devices 104, such as a display, a keyboard, a mouse, and associated controllers, a hard drive or disk storage 106, and various other subsystems 108. In certain embodiments, a VR headset is included in subsystems 108.

In various embodiments, the information handling system 100 also includes network port 110 operable to connect to a network 140, which is likewise accessible by a service provider server 142. The network 140 may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope or intent of the invention. Implementations provide for wireless connection of the information handling system 100 to network 140 and other devices using technology such as Bluetooth.

The information handling system 100 likewise includes system memory 112, which is interconnected to the foregoing via one or more buses 114. System memory 112 further includes an operating system (OS) 116 and applications 118. In certain embodiments, applications 118 are provided as a service from the service provider server 142. Implementations can provide for applications 118 to include a VR headset clamping force adjustment application 120. The VR headset clamping force adjustment application 120 allows for methods described herein to be implemented. Various implementations can include for system memory 112 to store user profiles 122 which include one or more user profiles that include for example, user iris scan data and user ergonomic adjustment preferences, such as clamping force, interpupillary distance or IPD of user, audio volume, optical engine projection brightness, etc. In certain implementations user profiles 122 are stored in an external database (not shown).

Figure 2:
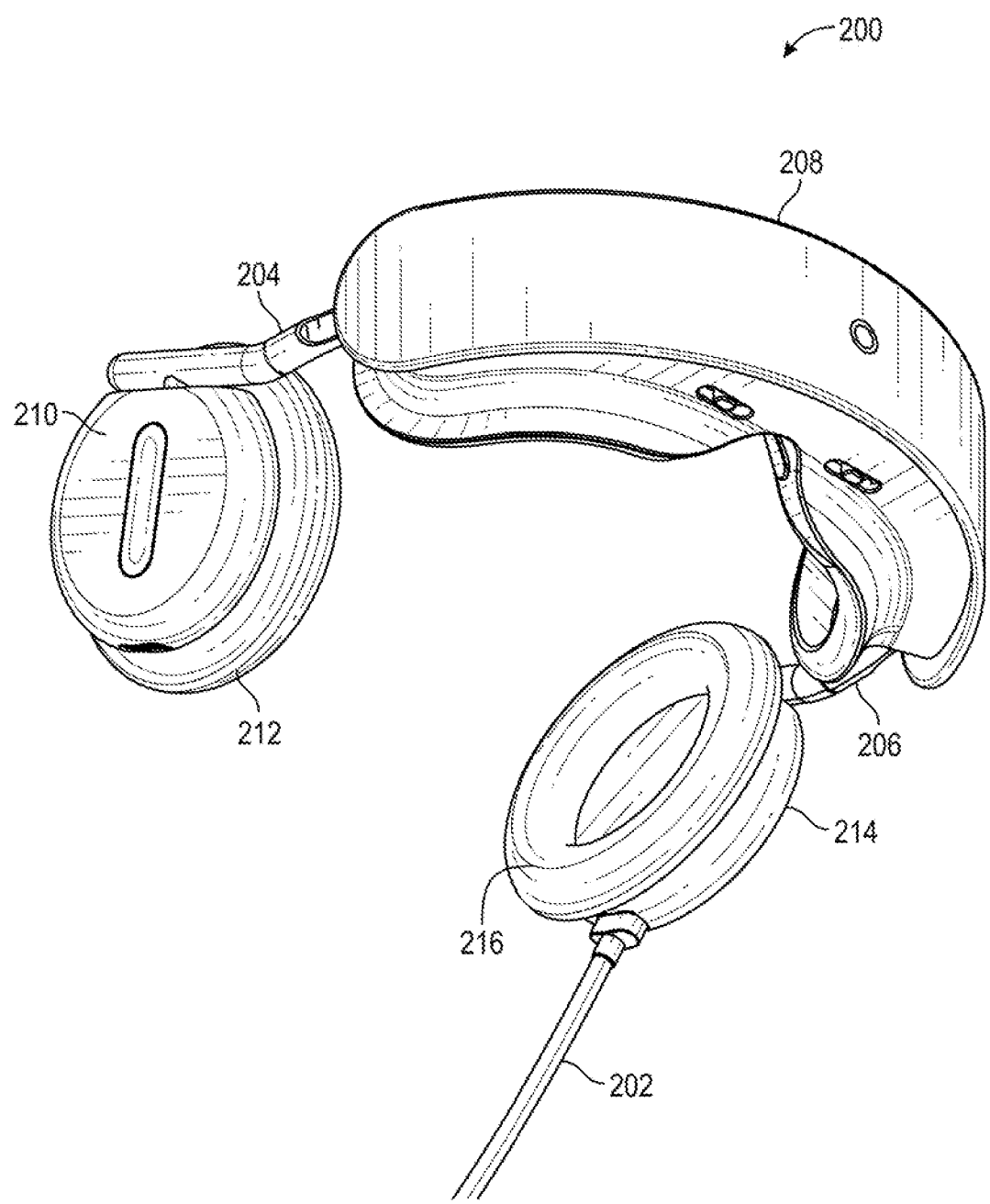
FIG. 2 depicts a bottom, front and right prospective view of a virtual reality headset.

FIG. 2 illustrates a bottom, front and right prospective view of a virtual reality (VR) headset. In certain embodiments, VR headset 200 is implemented as information handling system 100. Embodiments can provide that the VR headset 200 is connected to an information handling system 100 as another subsystem 108. Embodiments can provide that the VR headset 200 be implemented as I/O 104. For embodiments where VR headset is implemented as a subsystem 108 or I/O 104 a connection 202 can be provided to information handling system 100. Connection 202 can be wired or wireless (e.g., Bluetooth connectivity).

In various embodiments, the VR headset 200 is a constructed as an open loop design or form factor that implements a "single band" that provides clamping forces to secure the VR headset 200 on a user's head and face. The "single band" provides for VR hardware and components and is used to support the VR headset 200 on a user. In contrast, typical VR headset devices implement a support band and a separate band that provides for the VR hardware and components.

In various embodiments, the "single band" is allowed to bend to a degree to adjust for clamping force, as further described herein. The single band includes a right support 204 and left support 206. Implementations provide for a rigid housing 208 that is allowed to pivot at the center of the "single band" allowing the "single band" to bend independently.

Right support 204 is connected to a right ear support 210 which is connected to right ear cup 212. Left support 206 is connected to a left ear support 214 which is connected to a left ear cup 216. Various implementations provide for a bayonet or other connection (not shown) between respective ear supports 210, 214 with ear cups 212 and 216 to allow pivoting of the VR headset 200 from a rest position on top of a user's head to a VR mode position on the user's face.

In various embodiments, the VR headset 200 includes an accelerometer (not shown). In general, and well known in the industry, accelerometers are sensing devices that measure an object's acceleration and movement. In various implementations, an accelerometer of the VR headset 200 can indicated that the VR headset 200 is being picked up from a stationery position to be used by a user. Embodiments can also provide for sensors and a sensing system, to be used to control clamping force of the ear cups 212 and 216.

Figure 3:
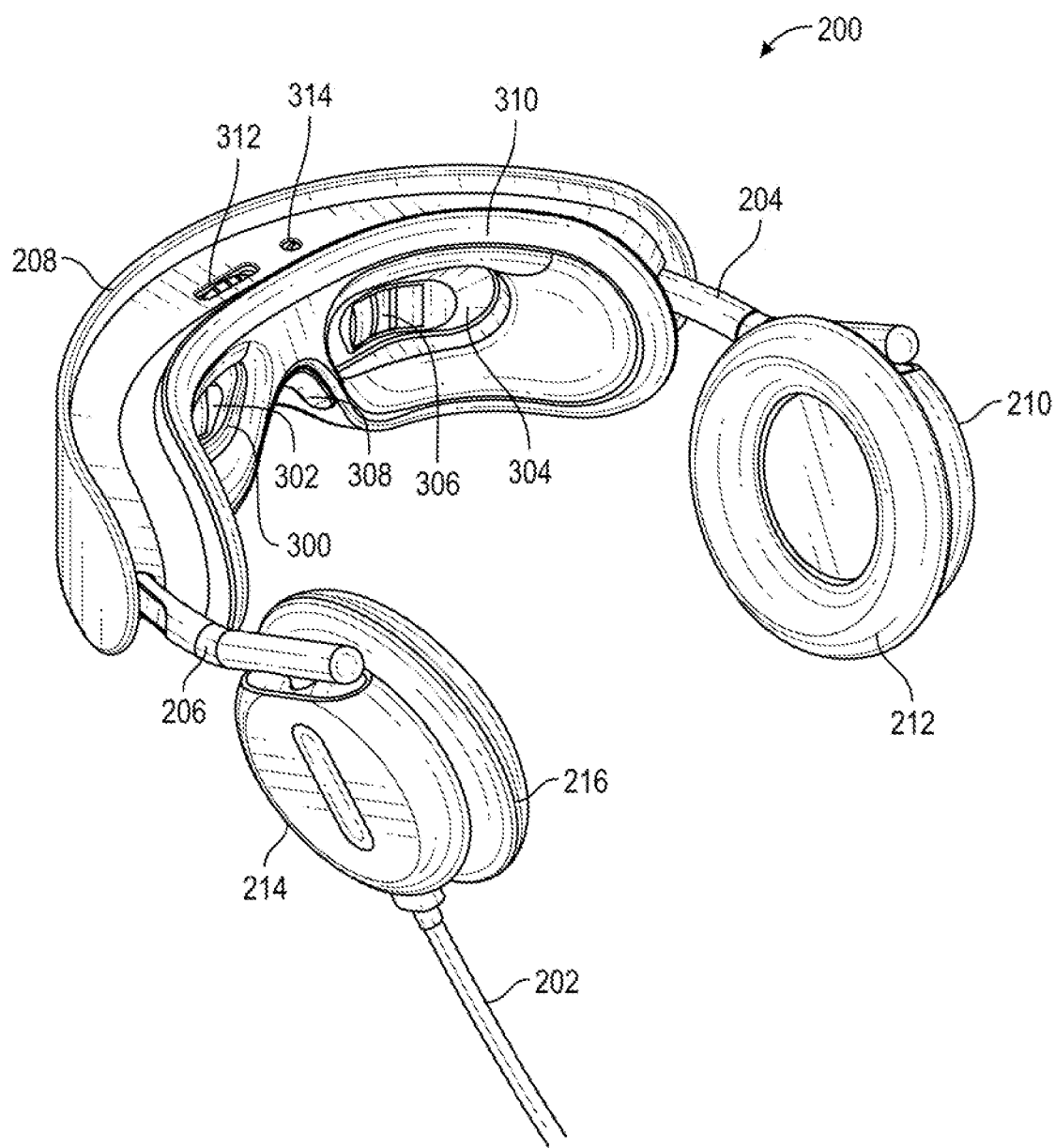
FIG. 3 depicts a top, back, and left prospective view of a virtual reality headset.

FIG. 3 illustrates a top, back, and left prospective view of the VR headset 200. Implementations provide for a left optical engine 300 that includes a camera 302, and a right optical engine 304 that includes a camera 304. A nose piece structure 308 is shown. The optical engines include lenses (not shown) that properly focus VR images to a user's eyes. In various implementations, the clamping force adjustments provide for a particular distance from the lenses to the user's eyes to maintain proper VR focus distance.

Various implementations can also provide for a rear housing or cover 310 that protects hardware and components of the VR headset 200. Embodiments provide for the cover 310 to be a flexible mask that flexes or deforms with the bending "single band." Implementations can also provide for a control wheel 312 to adjust VR headset 200, and particularly clamping force adjustment of the VR headset 200. Additional controls and buttons, as represented by 314 can also be implemented. Examples of controls include a plus/minus buttons to control clamping force of the clamping force adjustment mechanism described herein.

Figure 4:
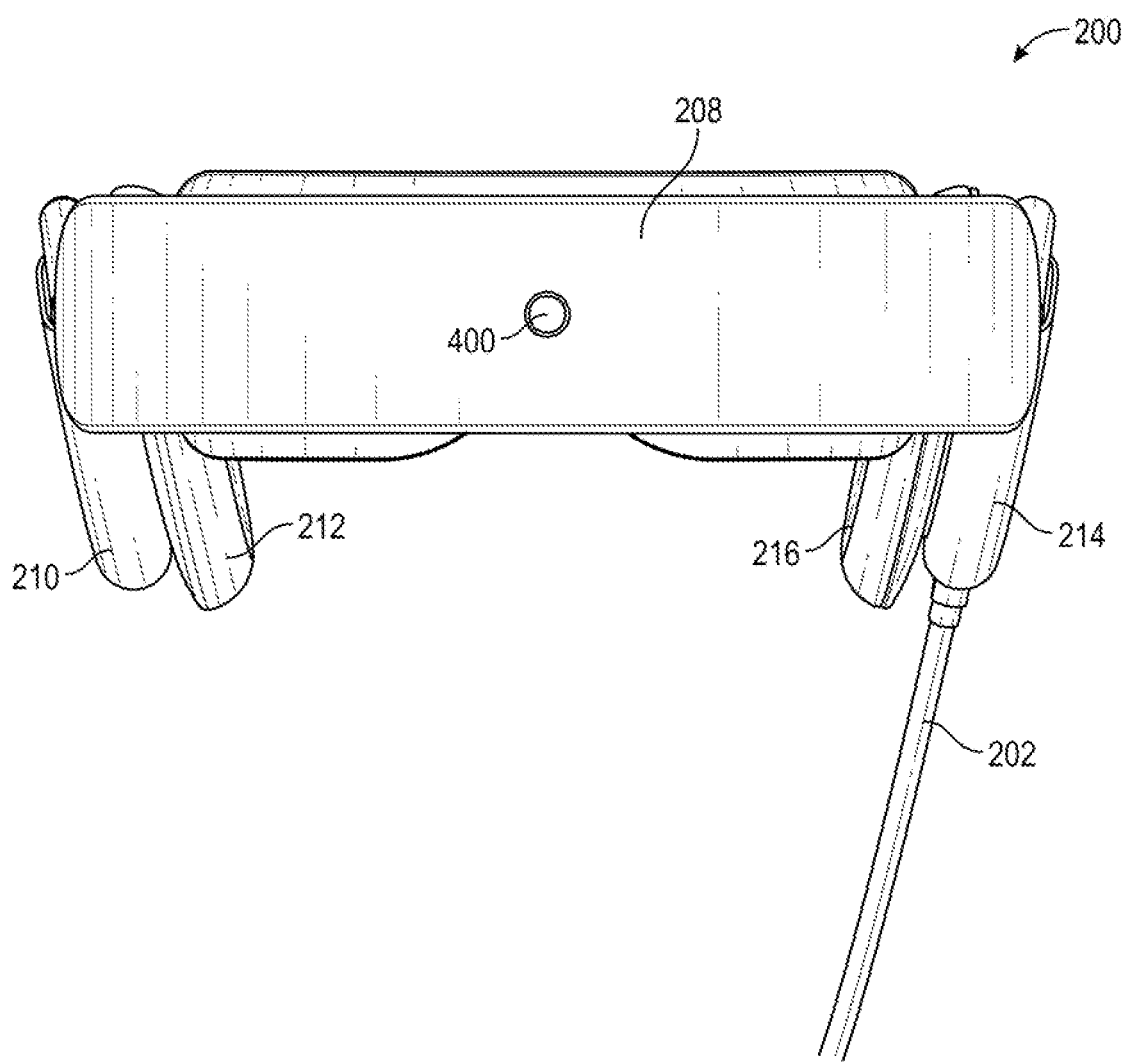
FIG. 4 depicts a front elevation view of a virtual reality headset.

FIG. 4 illustrates a front elevation view of the VR headset 200. Implementations can provide for a button or control, such as 400. The button 400 can be used in various implementations to turn on and off the VR headset 200.

Figure 5:
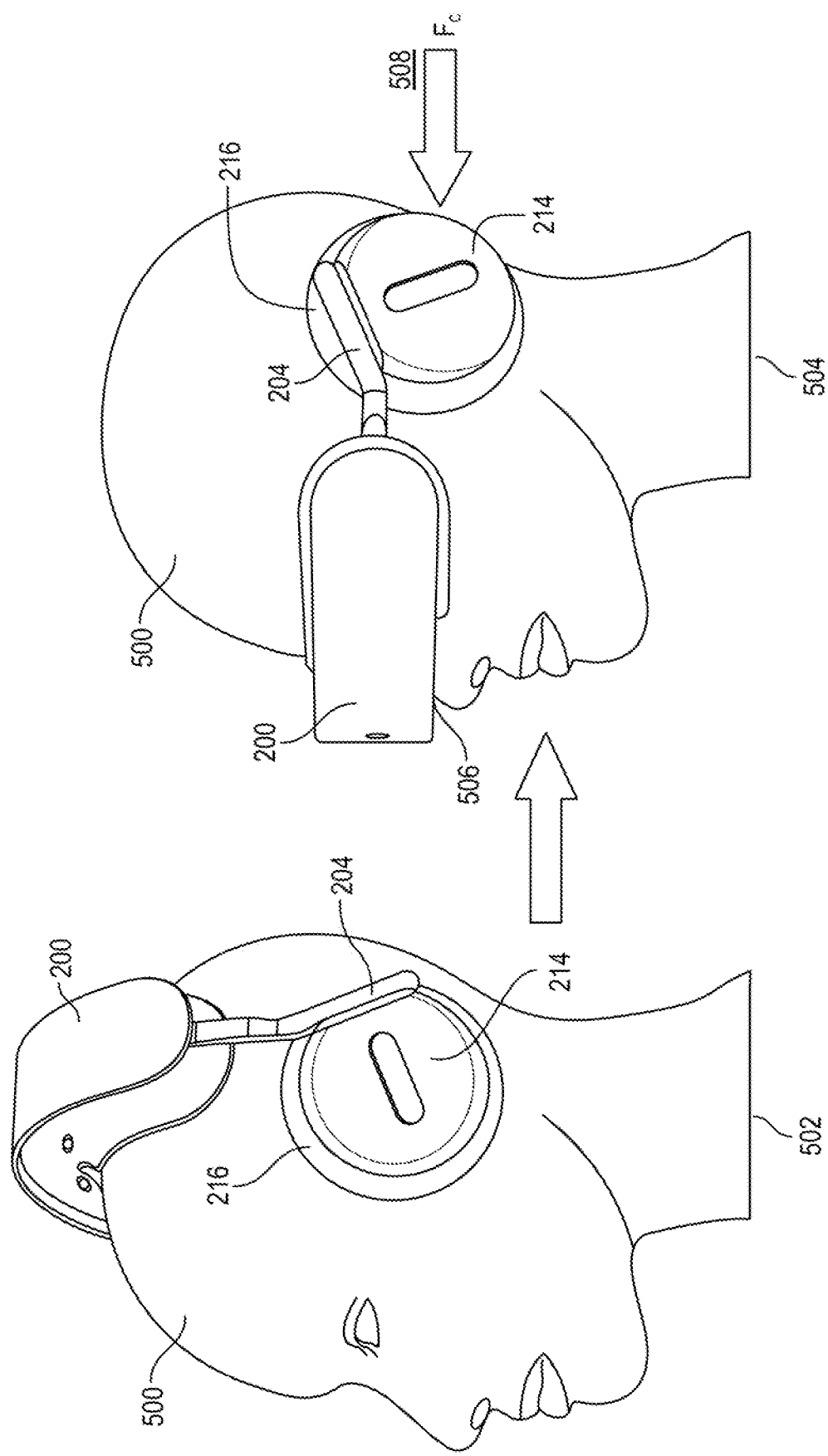
FIG. 5 depicts a bottom elevation view of the VR headset 200 and a clamping force adjustment mechanism.

FIG. 5 shows transition from a resting position to a VR mode position of the VR headset 200. When a user 500 places the VR headset on, a rest position 502 provides for the VR headset 200 to be on top of the head of user 500. When transitioning to a VR mode position 504, the VR headset 200 rests on the face of the user 500. Different clamping forces are applied at rest position 502 and VR mode position 504, considering the distance between ear cups 212 and 216 are different at positions 502 and 504. Furthermore, the weight of the VR headset 200 can primarily rest on user's nose 506.

A head exerting reaction force Fc 508 is different for the positions 502 and 504. The clamping force can be adjusted manually by the use of the control wheel, or in certain implementations, a user profile is used to look up clamping forces for the user 500 at positions 502 and 504.

Figure 6:
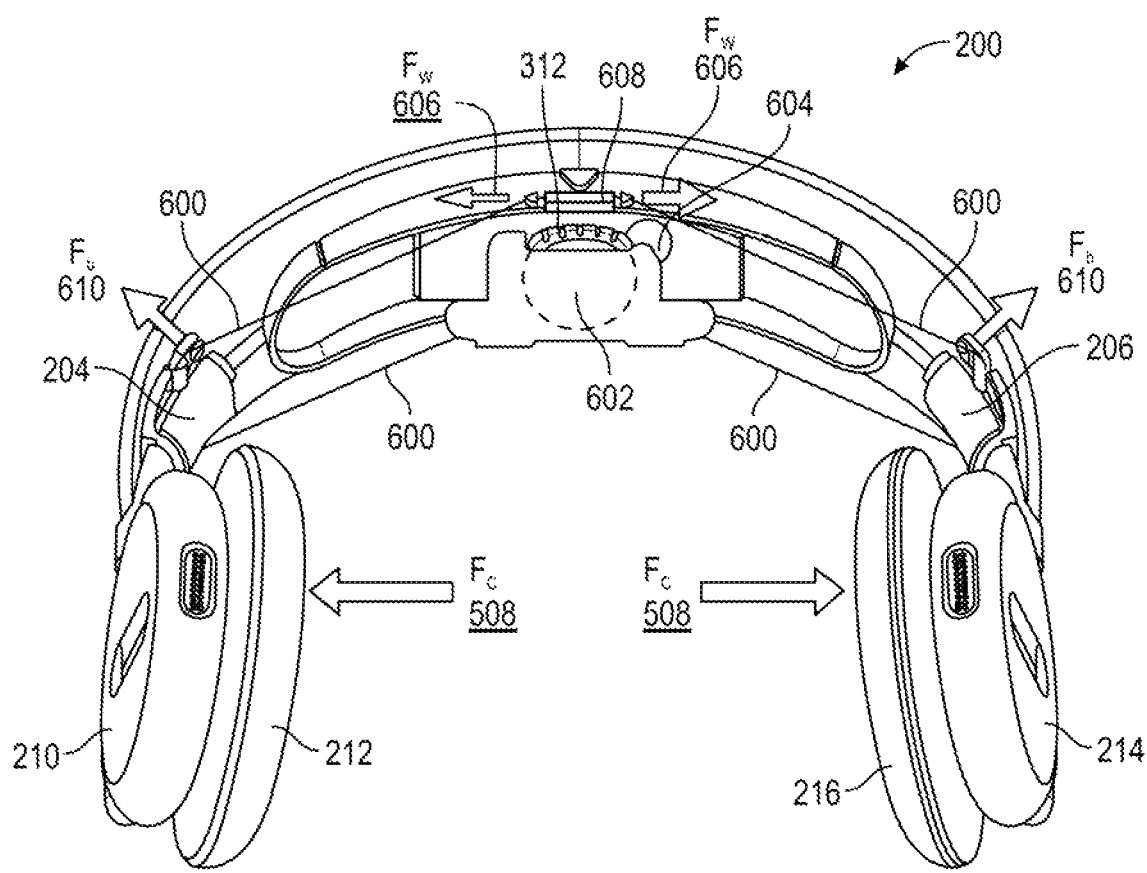
FIG. 6 depicts a bottom elevation view of the VR headset 200 and a clamping force adjustment mechanism.

FIG. 6 shows a bottom elevation view of the VR headset 200 and a clamping force adjustment mechanism. Embodiments provide for the clamping force adjustment mechanism to include a wire 600 which can be connected or passes through the ends of the "single band", such as right support 204 and left support 206. Implementations can provide for manual adjustment by using the control wheel 312 to pull the ends of the "single band" together by taking up the wire 500, or letting out the wire 500 to allow the ends of the "single band" to move away from one another. Therefore, clamping force Fc 508 at earcups 212 and 216 is increased or decreased.

In various implementations, a take up reel or wire retention wheel 602 is configured to pull in the wire 600 to increase clamping force or to let out the wire 600 to decrease clamping force. Certain embodiments provide for a motor 604 to receive input as to the amount of movement of the wire retention wheel 602 in relationship to the amount of clamping force is determined. In certain implementations, motor 604 is an incrementally adjusted stepper motor.

When a user places the VR headset 200 on, the head exerting reaction force Fc 508 is placed on the ear cups 212, 216, as the clamping force adjustment mechanism pushes on the ear cups 212, 216. The force of the clamping force adjustment mechanism is represented by Fw 606. In implementations that used a stepper motor, for every step the motor 605 makes, there can be a given Fw 606 value. When, the clamping force adjustment mechanism determines that the force due to ear up compression or Fc 508 reaches an acceptable or comfort level for the user, the wire retention system stops winding.

Various implementations can provide for a strain gauge 608 that is attached to ends of the wire 600. The strain gauge 608 is configured to measure tension in wire 600 or Fw 606. Data derived from the strain gauge 610 can be used to derive clamping force. Fb 610 represents a bending force of the "single band". Bending the "single band increases Fb 610.

Figure 7:
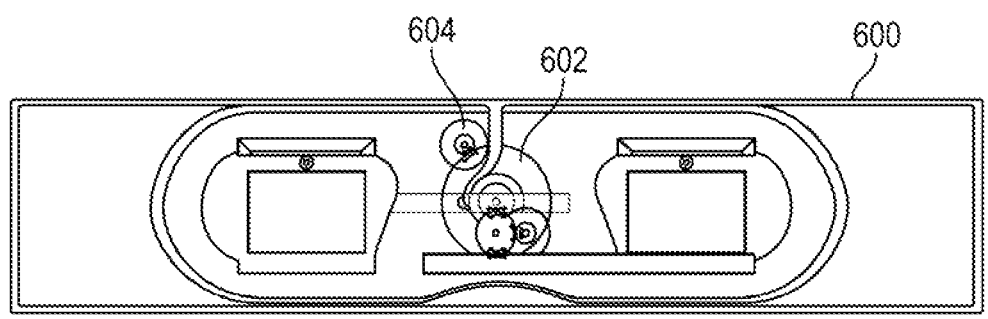
FIG. 7 depicts a retention system used for clamping force of a virtual reality headset.

FIG. 7 shows a wire retention system used for clamping force of the VR headset 200. The wire retention system is further described herein. In various implementations, the wire 600 is connected at ends of the "single band" or passed through, such as anchor points on right support 204 and left support 206, as further described herein. A take up reel or wire retention wheel 602 is configured to pull in the wire 600 to increase clamping force or to let out the wire 600 to decrease clamping force. In for embodiments with the motor 604, the motor 604 is provided input as to the amount of movement of the wire retention wheel 602 in relationship to the amount of clamping force is determined.

Figure 8:
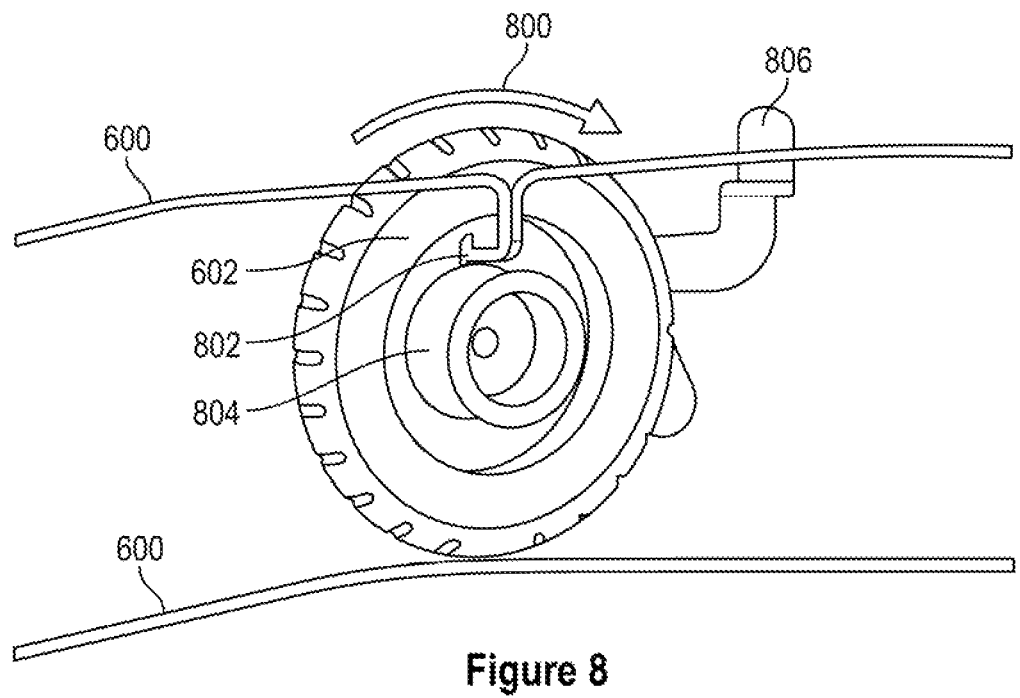
FIG. 8 depicts an outer view of a take up reel or wire retention wheel of a virtual reality headset.

FIG. 8 shows an outer view of a take up reel or wire retention wheel 602 of the VR headset 200. When winding or increasing the clamping force of the clamping force adjustment mechanism, the wire 600 is wound up on the wire retention wheel 602. For manual implementations, for example, the wire retention wheel 602 can be turned in direction 800 by a user. The wire 600 can be run through a hole 802 and loop around a core 804 of the wire retention wheel 602. In certain embodiments, a knob 806 is provided, which can be depressed to allow release of the wire 800, as described in FIG. 9.

Figure 9:
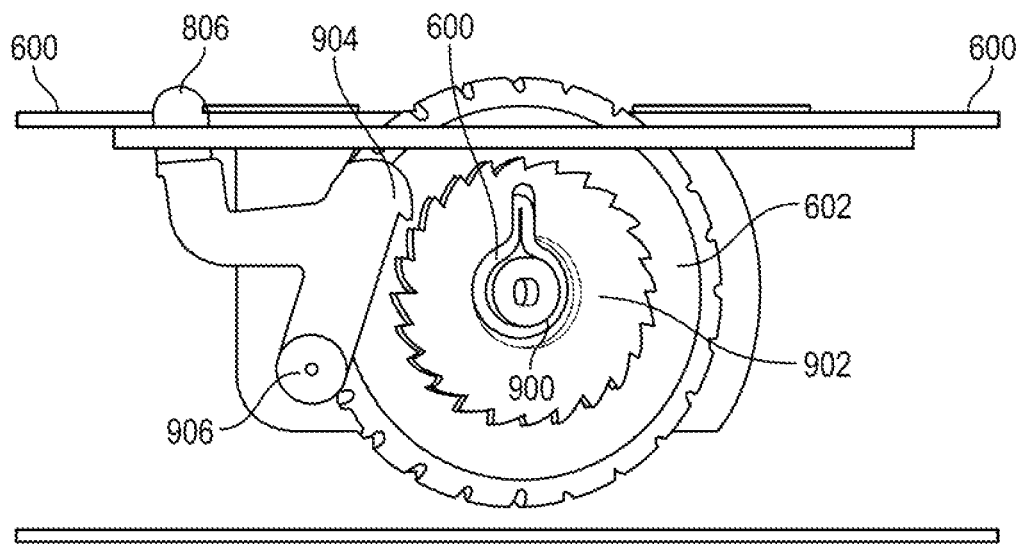
FIG. 9 depicts an inner view of the take up reel or wire retention wheel of a virtual reality VR headset.

FIG. 9 shows an inner view of the take up reel or wire retention wheel 602 of the VR headset 200. When releasing the wire to decrease clamping force of the clamping force adjustment mechanism, and particularly for embodiments that provide for manual adjusting, the knob 806 is depressed. Implementations provide for a ratcheting mechanism. The wire 600 goes through the hole 802 and makes a loop around axis 900. A rachet 902 is provided on the wire retention wheel 602. When a user desires to release the ratchet 902, knob 806 is depressed which turns a hooked lever 904 that is sprung on a pivot 906. The "single band" of the VR headset 200 returns to a zero force clamping position. In other words, the bending force Fb 610 decreases.

Figure 10:
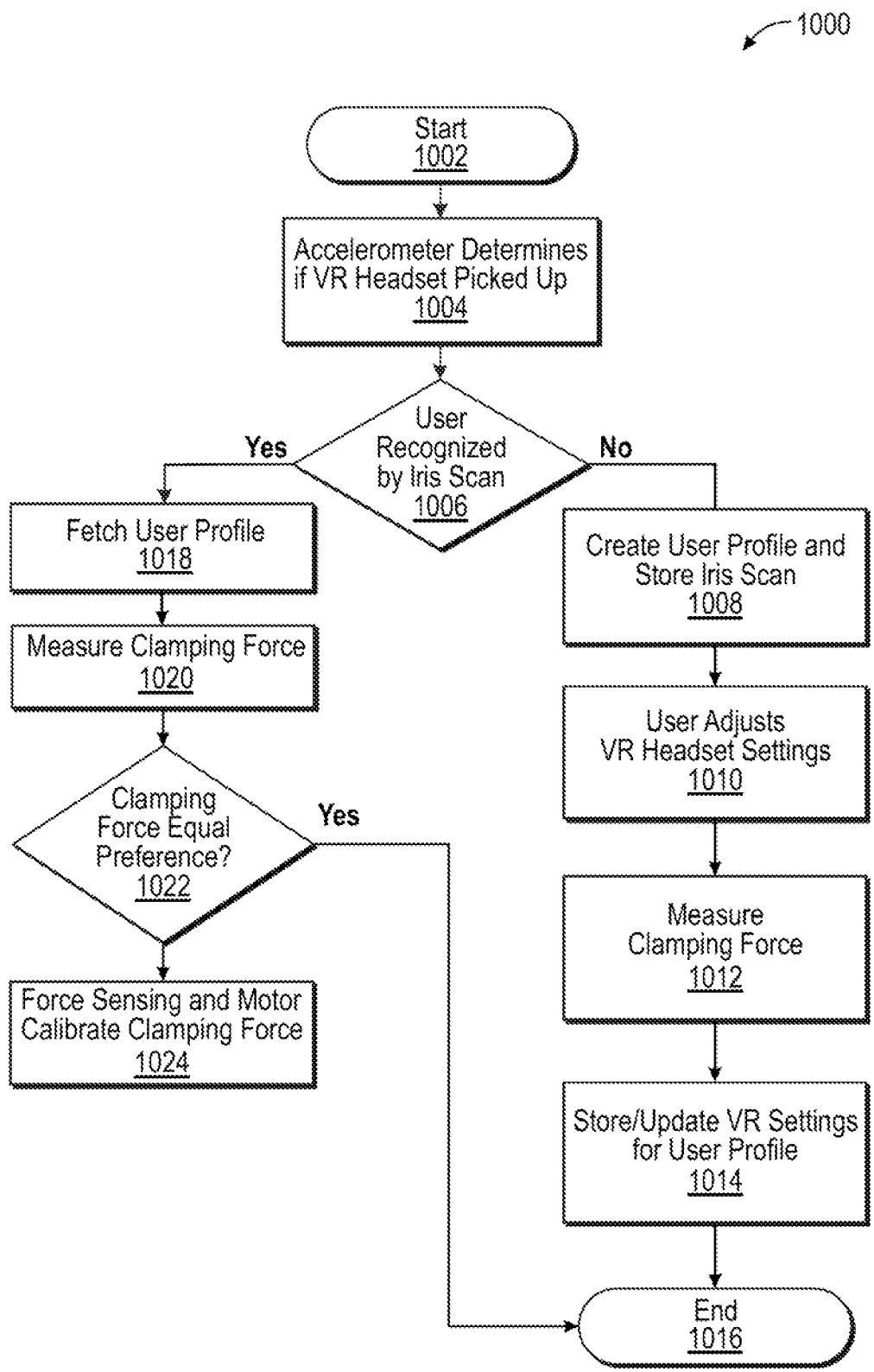
FIG. 10 shows a flowchart of an example of using user recognition and clamping force preferences to control the adjustment of a virtual reality headset.

FIG. 10 shows a flow chart of an example scenario of user recognition and preferences are used to the control the clamping force adjustment of VR headset 200. A user defines their settings. A particular user is recognized, and their settings are applied to the VR headset 200.

The flowchart 1000 illustrates one scenario; however, it is to be understood that other scenarios are possible for which the described VR headset 200 supports. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein.

At step 1002, the process 1000 starts. At step 1204, a determination is performed that the VR headset 200 has been picked up for use. Implementations can provide for an accelerometer in the VR headset to perform the determination, providing input back to a processor (e.g., CPU 102).

At step 1006, an iris scan of a user is performed by cameras 302, 306 of respective optical engines 300, 304. A determination is made of the user. If a user's iris is recognized, the "Yes" branch of step 1006 is followed. If a user's iris is not recognized, the "No" branch of 1006 is followed. Recognition can be based on comparing the scanned iris to irises of user profiles 122. Implementations provide for user profiles 122 to be included in memory 122 and/or a database.

At step 1008, following the "No" branch of step 1006, a user profile is created with the iris scan of the user. This user profile can be in stored in user profiles 122. At step 1010, adjustments are made to VR headset 200 settings, as to user preferences, and particularly clamping force which can be adjusted for different positions of use (i.e., resting position and VR mode position). The user may implement buttons or controls, and a control wheel on the VR headset 200. At step 1412, sensors or a sensing system, such as one implementing force sensitive resistors on earcups 212 and 216, measure clamping force. At step 1014, the user profile is stored/updated with the information determined at steps 1008 to 1012. At step 1016, the process 1000 ends.

At step 1018, following the "Yes" branch of step 1006, a user profile is fetched from user profiles 122 based on the iris scan of the user. At step 1020, the sensors or sensing system, measure clamping force.

At step 1022 a determination is performed if clamping force is equal to the preference set in the user profile. If the clamping force is not equal to the preference set in the user profile, following the "No" branch of step 1022, step 1024 is performed, else if the "Yes" branch of step 1022 is followed, at step 1016, the process 1000 ends. At step 1024, the sensors or sensing system, measure clamping force. The sensor data can be provided back to a processor (e.g., CPU 102) for use in adjusting clamping force adjustment mechanism. Motor 604 adjusts clamping force of the clamping force adjustment mechanism of the VR headset 200. At step 1016, the process 1000 ends.

Figure 11:
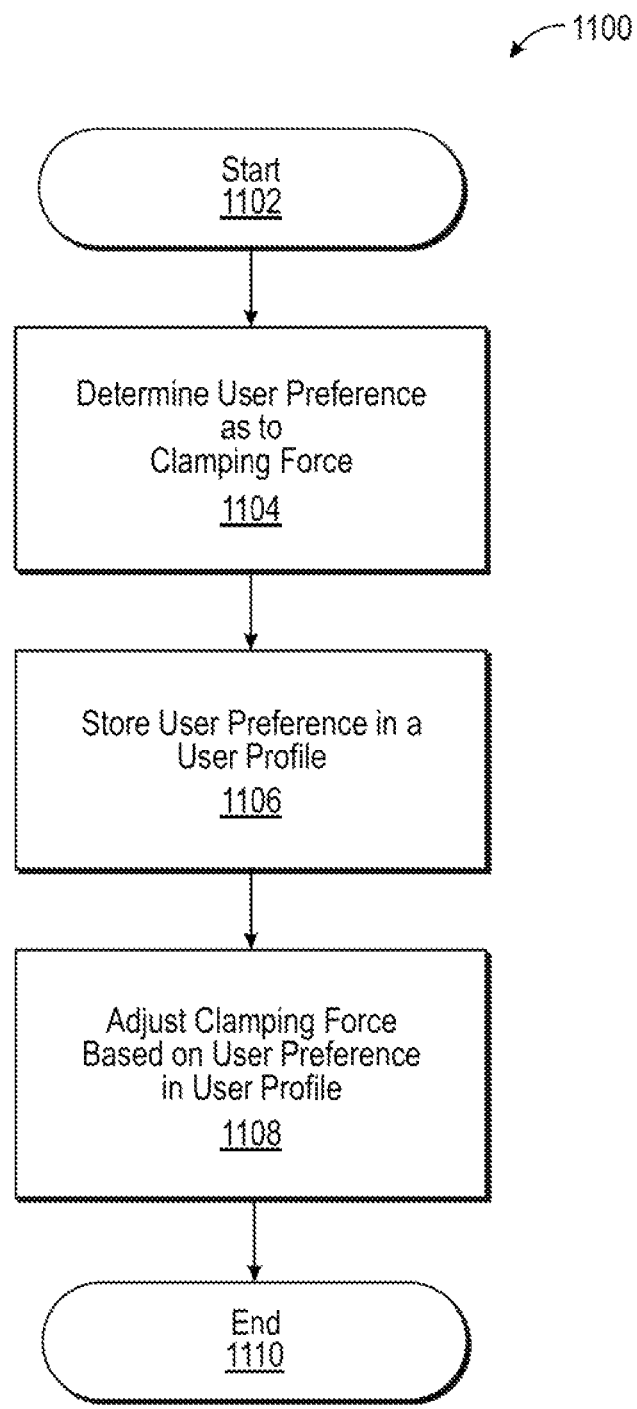
FIG. 11 shows a flow chart for providing clamping force adjustments to a virtual reality headset.

FIG. 11 is a generalized flowchart 1100 for providing clamping force adjustments to VR headset 200. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 1102, the process 1100 starts. At step 1104, determination is made as to user preference regarding clamping force. In various implementations, the components and elements described herein can perform step 1104.

At step 1106, the preferences are stored in a user profile. The user profile can be fetched from memory or a database, and be included with other user profiles (e.g., user profiles 122). A unique iris scan can identify particular users and their user profiles.

At step 1108, clamping force is adjusted based on the user preference in the user profile. At step 1110, the process 1100 ends.

As will be appreciated by one skilled in the art, the present invention can be embodied as a method, system, or computer program product. Accordingly, embodiments of the invention can be implemented entirely in hardware, entirely in software (including firmware, resident software, microcode, etc.) or in an embodiment combining software and hardware. These various embodiments can all generally be referred to herein as a "circuit," "module," or "system." Furthermore, the present invention can take the form of a computer program product on a computer-usable storage medium having computer-usable program code embodied in the medium.

Any suitable computer usable or computer readable medium can be utilized. The computer-usable or computer-readable medium can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium can be any medium that can contain, store, communicate, or transport the program for use by or in connection with the instruction execution system, apparatus, or device.

Computer program code for carrying out operations of the present invention can be written in an object oriented programming language such as Java, Smalltalk, C++ or the like. However, the computer program code for carrying out operations of the present invention can also be written in conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through a local area network (LAN) or a wide area network (WAN), or the connection can be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method of performing clamping force adjustment on a virtual reality (VR) headset comprising:
   determining a user preference as to clamping force at one or more positions on the user's head of the VR headset;
   storing the user preference in a user profile;
   measuring clamping force at a position of the one or more positions of the user's head;
   adjusting the clamping force at the position based on determined user preference and measured clamping force at the position;
   wherein the VR headset is an open loop design; and
   wherein clamping force adjustment is performed by a clamping force adjustment mechanism implementing a take up wheel that lets out or pulls in a wire to decrease or increase clamping force.

2. The method of claim 1, wherein the determining is based on a user predetermined adjusted clamping force adjustments at the one or more positions.

3. The method of claim 1, wherein clamping force adjustment is performed to provide for a particular distance from the lenses to the user's eyes to maintain proper VR focus distance.

4. The method of claim 1 further comprising a ratcheting system that pulls in and lets out a wire to increase or decrease clamping force.

5. The method of claim 1 further comprising determining if the VR headset is picked up through an accelerometer.

6. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
      determining a user preference as to clamping force at one or more positions on the user's head of the VR headset;
      storing the user preference in a user profile;
      measuring clamping force at a position of the one or more positions of the user's head;
      adjusting the clamping force at the position based on determined user preference and measured clamping force at the position;
      wherein the VR headset is an open loop design; and
      wherein clamping force adjustment is performed by a clamping force adjustment mechanism implementing a take up wheel that lets out or pulls in a wire to decrease or increase clamping force.

7. The system of claim 6, wherein the determining is based on a user predetermined adjusted clamping force adjustments at the one or more positions.

8. The system of claim 6, wherein clamping force adjustment is performed to provide for a particular distance from the lenses to the user's eyes to maintain proper VR focus distance.

9. The system of claim 6 further comprising a ratcheting system that pulls in and lets out a wire to increase or decrease clamping force.

10. The system of claim 6 further comprising determining if the VR headset is picked up through an accelerometer.

11. A non-transitory, computer-readable storage medium embodying computer program code, the computer program code comprising computer executable instructions configured for:
   determining a user preference as to clamping force at one or more positions on the user's head of the VR headset;
   storing the user preference in a user profile;
   measuring clamping force at a position of the one or more positions of the user's head;
   adjusting the clamping force at the position based on determined user preference and measured clamping force at the position;
   wherein the VR headset is an open loop design; and
   wherein clamping force adjustment is performed by a clamping force adjustment mechanism implementing a take up wheel that lets out or pulls in a wire to decrease or increase clamping force.

12. The non-transitory, computer-readable storage medium of claim 11, wherein the determining is based on a user predetermined adjusted clamping force adjustments at the one or more positions.

13. The non-transitory, computer-readable storage medium of claim 11, wherein clamping force adjustment is performed to provide for a particular distance from the lenses to the user's eyes to maintain proper VR focus distance.

14. The non-transitory, computer-readable storage medium of claim 11 further comprising determining if the VR headset is picked up through an accelerometer.

* * * * *